United States Patent
Schmit et al.

(10) Patent No.: US 11,911,847 B2
(45) Date of Patent: Feb. 27, 2024

(54) METHOD FOR PRODUCING A PRESS-HARDENED LASER WELDED STEEL PART AND PRESS-HARDENED LASER WELDED STEEL PART

(71) Applicant: ArcelorMittal, Luxembourg (LU)

(72) Inventors: Francis Schmit, Clermont (FR); Maria Poirier, Villers-Saint-Paul (FR); Sadok Gaied, Saint Maximin (FR)

(73) Assignee: ARCELORMITTAL, Luxembourg (LU)

( * ) Notice: Subject to any disclaimer, the term of this patent is extended or adjusted under 35 U.S.C. 154(b) by 597 days.

(21) Appl. No.: 16/976,392

(22) PCT Filed: Feb. 26, 2019

(86) PCT No.: PCT/IB2019/051528
§ 371 (c)(1),
(2) Date: Aug. 27, 2020

(87) PCT Pub. No.: WO2019/166941
PCT Pub. Date: Sep. 6, 2019

(65) Prior Publication Data
US 2021/0053154 A1   Feb. 25, 2021

(51) Int. Cl.
*B23K 26/322*   (2014.01)
*B23K 26/323*   (2014.01)
(Continued)

(52) U.S. Cl.
CPC .......... *B23K 26/322* (2013.01); *B23K 26/123* (2013.01); *B23K 26/32* (2013.01);
(Continued)

(58) Field of Classification Search
None
See application file for complete search history.

(56) References Cited

U.S. PATENT DOCUMENTS

| | | |
|---|---|---|
| 10,480,554 B2 | 11/2019 | Canourgues et al. |
| 2012/0186705 A1 | 7/2012 | Sikora et al. |
| | (Continued) | |

FOREIGN PATENT DOCUMENTS

| | | | |
|---|---|---|---|
| CA | 2999105 A1 * | 3/2017 | ............ B23K 26/26 |
| CN | 104204257 A | 12/2014 | |
| | (Continued) | | |

OTHER PUBLICATIONS

Machine translation of CN104204257A. (Year: 2014).*
(Continued)

*Primary Examiner* — Xiaowei Su
(74) *Attorney, Agent, or Firm* — Davidson, Davidson & Kappel, LLC (57) ABSTRACT

A method for producing a part includes providing a first and a second precoated sheet (1,2), butt welding the first and second precoated sheets (1) to obtain a blank (15), and heating the blank (15) to a heat treatment temperature at least 10° C. lower than the full austenitization temperature of the weld joint (22) and at least 15° C. higher than a minimum temperature $T_{min}$:

$$T_{min}(°\text{C.}) = AC3(WJ) - \frac{\alpha_{IC}^{max}}{100}(Ac3(WJ) - 673 - 40 \times \text{Al}).$$

(Continued)

where
Ac3(WJ) is the full austenitization temperature of the weld joint (22)

$$\alpha_{IC}^{max} = \left(1 - \frac{(1+\rho)(\max(1;\rho)Ts_2 - 350)}{(1-\beta)(\rho Ts_2 + Ts_1) + \beta(1+\rho)(3130C^{FW} + 750) - 350 \times (1+\rho)}\right) \times 100,$$

where
$T_{S1}$ and $T_{S2}$ are the ultimate tensile strengths of the strongest and the weakest substrate after press-hardening
$C^{FW}$ is the carbon content of the filler material
$\beta$ is the proportion of filler material
$\rho$ is the ratio between the thicknesses of the weakest and the strongest substrate The method also includes holding the blank (15) at the heat treatment temperature for a time between 2 and 10 minutes; and press-forming the blank (15) into a part and cooling.

19 Claims, 2 Drawing Sheets

(51) Int. Cl.

| | |
|---|---|
| B23K 26/12 | (2014.01) |
| B23K 26/32 | (2014.01) |
| C21D 9/50 | (2006.01) |
| C21D 9/46 | (2006.01) |
| C21D 1/673 | (2006.01) |
| C21D 1/18 | (2006.01) |
| B23K 35/30 | (2006.01) |
| C22C 38/00 | (2006.01) |
| C22C 38/02 | (2006.01) |
| C22C 38/06 | (2006.01) |
| C22C 38/42 | (2006.01) |
| C22C 38/44 | (2006.01) |
| C22C 38/50 | (2006.01) |
| C22C 38/54 | (2006.01) |
| C22C 38/58 | (2006.01) |
| B62B 3/02 | (2006.01) |
| B62B 3/10 | (2006.01) |
| B62B 3/12 | (2006.01) |
| B23K 101/18 | (2006.01) |
| B23K 103/04 | (2006.01) |
| B23K 101/00 | (2006.01) |
| B23K 26/24 | (2014.01) |
| C22C 38/48 | (2006.01) |

(52) U.S. Cl.
CPC ........ *B23K 26/323* (2015.10); *B23K 35/3073* (2013.01); *B62B 3/02* (2013.01); *B62B 3/106* (2013.01); *B62B 3/12* (2013.01); *C21D 1/185* (2013.01); *C21D 1/673* (2013.01); *C21D 9/46* (2013.01); *C21D 9/50* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/50* (2013.01); *C22C 38/54* (2013.01); *C22C 38/58* (2013.01); *B23K 26/24* (2013.01); *B23K 2101/006* (2018.08); *B23K 2101/185* (2018.08); *B23K 2103/04* (2018.08); *B62B 2202/22* (2013.01); *B62B 2205/30* (2013.01); *C21D 2211/001* (2013.01); *C21D 2211/002* (2013.01); *C21D 2211/005* (2013.01); *C21D 2211/008* (2013.01); *C22C 38/48* (2013.01)

(56) References Cited

U.S. PATENT DOCUMENTS

| | | |
|---|---|---|
| 2012/0279621 A1 | 11/2012 | Gerber et al. |
| 2014/0057128 A1 | 2/2014 | Canourgues et al. |
| 2014/0216612 A1 | 8/2014 | Lauren et al. |
| 2014/0231395 A1 | 8/2014 | Brandt et al. |
| 2015/0043962 A1 | 2/2015 | Miyazaki et al. |
| 2015/0306702 A1 | 10/2015 | Breuer et al. |
| 2016/0144456 A1 | 5/2016 | Kim |
| 2016/0368094 A1 | 12/2016 | Breuer et al. |
| 2018/0326538 A1 | 11/2018 | Breuer et al. |

FOREIGN PATENT DOCUMENTS

| | | |
|---|---|---|
| DE | 102013101953 A1 | 8/2014 |
| DE | 102015115915 A1 | 3/2017 |
| EP | 2007545 A1 | 12/2008 |
| EP | 2374910 A1 | 10/2011 |
| EP | 2737971 A1 | 6/2014 |
| EP | 2896466 A1 | 7/2015 |
| JP | 2013204090 A | 10/2013 |
| RU | 2403309 C2 | 11/2010 |
| RU | 2573454 C2 | 1/2016 |
| WO | WO2007125182 | 11/2007 |
| WO | WO2014075824 A1 | 5/2014 |

OTHER PUBLICATIONS

Hanlon et al: Quantitative phase analysis of multi-phase steels, PHAST (2007), ISBN 92-79-02658-5, pp. 77-79.
Search Report PCT/IB2019/051528.
Search Report for PCT/IB2018/051237.
Kasuya Tadashi "FLux Cored Wire for Fatigue Strength Improvement, SX-1LD", pp. 1-4 (2009), with machine translation.

* cited by examiner

METHOD FOR PRODUCING A PRESS-HARDENED LASER WELDED STEEL PART AND PRESS-HARDENED LASER WELDED STEEL PART

The present disclosure relates to a method for producing a press-hardened laser welded steel part and to the thus obtained press-hardened laser welded steel part.

BACKGROUND

Steel parts of this type are used in particular in the automobile industry, and more particularly for the fabrication of crash management parts, such as anti-intrusion or shock absorption parts, structural parts or parts that contribute to the safety of motor vehicles.

For such types of parts, the motor vehicle manufacturers prescribe that the weld joint should not constitute the weakest zone of the welded steel part.

In order to prevent corrosion, the steel sheets used for manufacturing such welded steel parts are precoated with an aluminum-based precoating through hot dip coating in an aluminum-containing bath. If the steel sheets are welded without any prior preparation, the aluminum-based precoating will be diluted with the steel substrate within the molten metal during the welding operation. The aluminum tends to increase the full austenitization temperature of the molten metal, and therefore prevents the complete transformation into austenite during hot forming using conventional heat treatment temperatures. Consequently, it may no longer be possible to obtain an entirely martensitic or bainitic microstructure in the weld joint during the press-cooling occurring during the hot forming process.

Furthermore, using higher heat treatment temperatures, which would allow a complete austenitization of the weld joint, is not possible, since it would result in an over-alloying of the coating with potential negative consequences on the adhesion of paint and/or on the spot weldability of the press-hardened part.

Faced with this situation, when manufacturing parts from such precoated steel sheets, two types of solutions have been developed in the prior art in order to be able to obtain a fully martensitic structure in the weld joint after hot forming and quenching using conventional heat treatment temperatures.

In particular, EP2007545 describes a first solution which consists in removing the superficial layer of metal alloy at the weld edges of the precoated steel sheets so as to significantly decrease the total content of aluminum in the weld joint and therefore obtain a full austenitization temperature close to that of the base material of the precoated steel sheets.

Furthermore, EP 2 737 971, US 2016/0144456 and WO 2014075824 describe a second solution which consists in welding the precoated steel sheets using a filler wire comprising austenite-stabilizing elements, such as carbon, manganese or nickel, so as to compensate for the presence of aluminum in the weld joint and to decrease the full austenitization temperature thereof, such that a fully martensitic structure may be obtained in the weld joint after hot forming and quenching using conventional heat treatment temperatures.

SUMMARY

These methods are, however, not entirely satisfactory.
Indeed, the first method is relatively time consuming.
Furthermore, the second method may necessitate the addition of a relatively large amount of austenite-forming elements in order to be able to obtain an entirely martensitic structure in the weld joint after heat treatment. This addition increases the production cost, and further may result in issues resulting from a non-satisfactory weld joint geometry or from a non-homogeneous mix between the material from the precoated steel sheets and from the filler wire in the weld joint with the risk to have locally retained austenite.

An object of the present disclosure is therefore to provide a method for producing a welded steel blank from two such precoated sheets that allows obtaining, after press-hardening, a part having satisfactory crash performance properties, even for relatively high aluminum contents in the weld joint, at relatively low cost.

For this purpose, the present disclosure relates to a method for producing a press-hardened laser welded steel part comprising the following successive steps:

providing a first precoated steel sheet and a second precoated steel sheet, each of the first and second precoated steel sheets comprising a steel substrate, at least one of the first and second precoated steel sheets having, on at least one of its main faces, an aluminum-containing precoating comprising at least 50% by weight of aluminum, the first precoated steel sheet having a first thickness and the second precoated steel sheet having a second thickness, the substrate of the first precoated steel sheet having, after press-hardening, an ultimate tensile strength strictly greater than the ultimate tensile strength, after press-hardening, of the substrate of the second precoated steel sheet, and the product of the first thickness by the ultimate tensile strength, after press-hardening, of the first precoated steel sheet being strictly greater than the product of the second thickness by the ultimate tensile strength of the second precoated steel sheet, then removing the aluminum-containing precoating over at least a fraction of its thickness on at least one main face at a weld edge or edge to be welded of at least one of the first and second precoated steel sheets, at least if the theoretical average aluminum content in the weld joint obtained by butt welding the first and second precoated steel sheets provided at the provision step, possibly using a filler material containing at most 0.05 wt. % of aluminum, is strictly greater than 1.25 wt. %, such that the theoretical average aluminum content in the weld joint obtained by butt welding the thus prepared first and second precoated steel sheets, possibly using a filler material containing at most 0.05 wt. % of aluminum, is comprised between 0.5 wt. % and 1.25 wt. %, butt welding the first precoated steel sheet and the second precoated steel sheet using laser welding so as to obtain a weld joint between the first and second precoated steel sheets thereby obtaining a welded blank, the welding step possibly including the use of a filler material, heating the welded blank to a heat treatment temperature, the heat treatment temperature being at least 10° C. lower than the full austenitization temperature of the weld joint and at least 15° C. higher than a minimum temperature $T_{min}$, where $$T_{min}(°\text{ C.}) = AC3(WJ) - \frac{\alpha_{IC}^{max}}{100}(Ac3(WJ) - 673 - 40 \times \text{Al})$$

where
Ac3(WJ) is the full austenitization temperature of the weld joint, in ° C. and Al is the content of aluminum in the weld joint, in wt. % and $\alpha_{IC}^{max}$ is the maximum intercritical ferrite content of the weld joint, calculated using the following formula $$\alpha_{IC}^{max} = \left(1 - \frac{(1+\rho)(\max(1;\rho)Ts_2 - 350)}{(1-\beta)(\rho Ts_2 + Ts_1) + \beta(1+\rho)(3130C^{FW} + 750) - 350 \times (1+\rho)}\right) \times 100,$$

where $T_{S1}$ is the ultimate tensile strength of the strongest substrate after press-hardening, in MPa $T_{S2}$ is the ultimate tensile strength of the weakest substrate after press-hardening, in MPa $C^{FW}$ is the carbon content of the filler material, in wt. %

$\beta$ is the proportion of filler material added to the weld pool, comprised between 0 and 1

$\rho$ is the ratio between the thickness of the precoated steel sheet comprising the weakest substrate and the thickness of the precoated steel sheet comprising the strongest substrate ($\rho = t_2/t_1$)

and holding the welded blank at the heat treatment temperature for a time comprised between 2 and 10 minutes;

press-forming the welded blank into a steel part; and cooling the thus formed steel part with a cooling speed greater than or equal to the critical martensitic or bainitic cooling speed of the most hardenable substrate among the substrates of the first and second precoated steel sheets so as to obtain a press-hardened welded steel part.

According to particular embodiments of the method:

the step of removing the aluminum-containing precoating is carried out:

if the theoretical average aluminum content in the weld joint obtained by butt welding the first and second precoated steel sheets provided at the provision step, possibly using a filler material containing at most 0.05 wt. % of aluminum, is strictly greater than 1.25 wt. %, and optionally, if the theoretical average aluminum content in the weld joint obtained by butt welding the first and second precoated steel sheets provided at the provision step, possibly using a filler material containing at most 0.05 wt. % of aluminum, is comprised between 0.5 wt. % and 1.25 wt. %, and more particularly strictly greater than 0.5 wt. %, this step being carried out such that the theoretical average aluminum content in the weld joint obtained by butt welding the thus prepared first and second precoated steel sheets, possibly using a filler material containing at most 0.05 wt. % of aluminum, is comprised between 0.5 wt. % and 1.25 wt. %;

at the end of the heating step, the microstructure of the substrates of the first and second precoated steel sheets is entirely austenitic;

the ratio between the ultimate tensile strength after press-hardening of the substrate of the first precoated steel sheet and the ultimate tensile strength after press-hardening of the substrate of the second precoated steel sheet is greater than or equal to 1.2;

the carbon content of the substrate of the first precoated steel sheet is higher by at least 0.05 wt. % than the carbon content of the substrate of the second precoated steel sheet;

each of the first and second precoated steel sheets provided in the provision step comprises an aluminum-containing precoating comprising at least 50% by weight of aluminum on at least one of its main faces;

the first and second precoated steel sheets provided in the provision step comprise an aluminum-containing precoating comprising at least 50% by weight of aluminum on both of their main faces;

at the time of butt welding, the aluminum-containing precoating remains integral on both main faces of at least one among the first precoated steel sheet and the second precoated steel sheet, and for example each of the first and the second precoated steel sheets;

the method further comprises, prior to butt welding, a step of preparing the weld edge of at least one among the first and the second precoated steel sheet, which is intended to be incorporated at least partially into the weld joint, by removing the aluminum-containing precoating over at least a fraction of its thickness on at least one main face thereof, even if the theoretical average aluminum content in the weld joint obtained by butt welding the first and second precoated steel sheets provided at the provision step, possibly using a filler material containing at most 0.05 wt. % of aluminum, is comprised between 0.5 wt. % and 1.25 wt. %, the method further comprises, prior to butt welding, a step of preparing the weld edge of at least one among the first and the second precoated steel sheet, which is intended to be incorporated at least partially into the weld joint, by removing the aluminum-containing precoating over at least a fraction of its thickness on at least one main face thereof, even if the theoretical average aluminum content in the weld joint obtained by butt welding the first and second precoated steel sheets provided at the provision step, possibly using a filler material containing at most 0.05 wt. % of aluminum, is comprised between 0.5 wt. % and 1.25 wt. %, the removal step being carried out in such a manner that the theoretical average aluminum content in the weld joint obtained by butt welding the thus prepared first and second precoated steel sheets, possibly using a filler material containing at most 0.05 wt. % of aluminum, remains comprised between 0.5 wt. % and 1.25 wt. %;

for at least one among the first and the second precoated steel sheets, the steel of the substrate comprises, by weight:
$0.10\% \leq C \leq 0.5\%$
$0.5\% \leq Mn \leq 3\%$
$0.1\% \leq Si \leq 1\%$
$0.01\% \leq Cr \leq 1\%$
$Ti \leq 0.2\%$
$Al \leq 0.1\%$
$S \leq 0.05\%$
$P \leq 0.1\%$
$B \leq 0.010\%$
the rest being iron and impurities resulting from manufacturing;

for at least one among the first and the second precoated steel sheets, the steel of the substrate comprises, by weight:
$0.15\% \leq C \leq 0.25\%$
$0.8\% \leq Mn \leq 1.8\%$
$0.1\% \leq Si \leq 0.35\%$
$0.01\% \leq Cr \leq 0.5\%$
$Ti \leq 0.1\%$
$Al \leq 0.1\%$
$S \leq 0.05\%$
$P \leq 0.1\%$
$B \leq 0.005\%$
the rest being iron and impurities resulting from manufacturing;

for at least one among the first and the second precoated steel sheets, the steel of the substrate comprises, by weight:

0.040% ≤ C ≤ 0.100%
0.70% ≤ Mn ≤ 2.00%
Si ≤ 0.50%
S ≤ 0.009%
P ≤ 0.030%
0.010% ≤ Al ≤ 0.070%
0.015% ≤ Nb ≤ 0.100%
Ti ≤ 0.080%
N ≤ 0.009%
Cu ≤ 0.100%
Ni ≤ 0.100%
Cr ≤ 0.2%
Mo ≤ 0.100%
Ca ≤ 0.006%,
the rest being iron and impurities resulting from manufacturing;
for at least one among the first and the second precoated steel sheets, the steel of the substrate comprises, by weight:
0.06% ≤ C ≤ 0.100%
1.4% ≤ Mn ≤ 1.9%
0.2% ≤ Si ≤ 0.5%
0.010% ≤ Al ≤ 0.070%
0.04% ≤ Nb ≤ 0.06%
3.4×N ≤ Ti ≤ 8×N
0.02% ≤ Cr ≤ 0.1%
0.0005% ≤ B ≤ 0.004%
0.001% ≤ S ≤ 0.009%
the rest being iron and impurities resulting from manufacturing;
for at least one among the first and the second precoated steel sheets, the steel of the substrate comprises, by weight:
0.24% ≤ C ≤ 0.38%
0.40% ≤ Mn ≤ 3%
0.10% ≤ Si ≤ 0.70%
0.015% ≤ Al ≤ 0.070%
0% ≤ Cr ≤ 2%
0.25% ≤ Ni ≤ 2%
0.015% ≤ Ti ≤ 0.10%
0% ≤ Nb ≤ 0.060%
0.0005% ≤ B ≤ 0.0040%
0.003% ≤ N ≤ 0.010%
0.0001% ≤ S ≤ 0.005%
0.0001% ≤ P ≤ 0.025%
wherein the titanium and nitrogen contents satisfy the following relationship:

Ti/N > 3.42, and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05% ≤ Mo ≤ 0.65%
0.001% ≤ W ≤ 0.30%
0.0005% ≤ Ca ≤ 0.005%
the rest being iron and impurities inevitably resulting from manufacturing;
the laser welding is performed using a protection gas, in particular helium and/or argon; and
the first and the second precoated steel sheets have different thicknesses.

The present disclosure further relates to a press-hardened laser welded steel part, said steel part comprising a first coated steel part portion and a second coated steel part portion,
each coated steel part portion comprising a steel substrate, at least one among the first coated steel part portion and the second coated steel sheet having, on at least one of its main faces, an aluminum-containing coating comprising at least 30% by weight of aluminum, the first coated steel part portion having a first thickness and the second coated steel sheet having a second thickness, the substrate of the first coated steel part portion having an ultimate tensile strength strictly greater than the ultimate tensile strength of the substrate of the second coated steel part portion, and the product of the first thickness by the ultimate tensile strength of the first coated steel part portion being strictly greater than the product of the second thickness by the ultimate tensile strength of the second coated steel part portion;
the first and second coated steel part portions being joined by a weld joint, said weld joint having an aluminum content comprised between 0.5 wt. % and 1.25 wt. %, and the microstructure of said weld joint comprising martensite and/or bainite and a fraction of intercritical ferrite comprised between 15% and a maximum intercritical ferrite fraction—5%, the maximum intercritical ferrite fraction being determined using the following formula:

$$\alpha_{IC}^{max} = \left(1 - \frac{(1+\rho)(\max(1;\rho)T_{S2} - 350)}{(1-\beta)(\rho T_{S2} + T_{S1}) + \beta(1+\rho)(3130C^{FW} + 750) - 350(1+\rho)}\right) \times 100,$$

where
$T_{S1}$ is the ultimate tensile strength of the strongest substrate after press-hardening, in MPa
$T_{S2}$ is the ultimate tensile strength of the weakest substrate after press-hardening, in MPa
$\beta$ is the proportion of filler material added to the weld pool, comprised between 0 and 1
$C^{FW}$ is the carbon content of the filler material, in wt. %
$\rho$ is the ratio between the thickness of the coated steel part portion comprising the weakest substrate and the thickness of the coated steel part portion comprising the strongest substrate ($\rho = t_2/t_1$)
and
the substrate of at least one among the first and the second coated steel part portions having a mainly martensitic and/or bainitic microstructure.

According to particular embodiments of the steel part, the ratio between the ultimate tensile strength of the substrate of the first coated steel part portion and the ultimate tensile strength of the substrate of the second coated steel part portion is greater than or equal to 1.2;
for at least one among the first and the second coated steel part portions, the steel of the substrate comprises, by weight:
0.10% ≤ C ≤ 0.5%
0.5% ≤ Mn ≤ 3%
0.1% ≤ Si ≤ 1%
0.01% ≤ Cr ≤ 1%
Ti ≤ 0.2%
Al ≤ 0.1%
S ≤ 0.05%
P ≤ 0.1%
B ≤ 0.010% the rest being iron and impurities resulting from manufacturing;

for at least one among the first and the second coated steel part portions, the steel of the substrate comprises, by weight:
0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005% the rest being iron and impurities resulting from manufacturing;

for at least one among the first and the second coated steel part portions, the steel of the substrate comprises, by weight:
0.040%≤C≤0.100%
0.70%≤Mn≤2.00%
Si≤0.50%
S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.2%
Mo≤0.100%
Ca≤0.006%, the rest being iron and impurities resulting from manufacturing;

for at least one among the first and the second coated steel part portions, the steel of the substrate comprises, by weight:
0.24%≤C≤0.38%
0.40%≤Mn≤3%
0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025% wherein the titanium and nitrogen contents satisfy the following relationship:

$$Ti/N > 3.42,$$

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05%≤Mo≤0.65%
0.001%≤W≤0.30%
0.0005%≤Ca≤0.005% the rest being iron and impurities inevitably resulting from manufacturing; and for at least one among the first and the second coated steel part portions, the steel of the substrate comprises, by weight:
0.06%≤C≤0.100%
1.4%≤Mn≤1.9%
0.2%≤Si≤0.5%
0.010%≤Al≤0.070%
0.04%≤Nb≤0.06%
3.4×N≤Ti≤8×N
0.02%≤Cr≤0.1%
0.0005%≤B≤0.004%
0.001%≤S≤0.009% the rest being iron and impurities resulting from manufacturing.

BRIEF DESCRIPTION OF THE DRAWINGS

The present disclosure will be better understood upon reading the following specification, given only by way of example and with reference to the appended drawings, wherein.

DETAILED DESCRIPTION

In the entire patent application, the contents of the elements are expressed in weight percent (wt. %).

The present disclosure relates to a method for producing a press-hardened laser welded steel part.

More particularly, the method comprises a first step of providing a first precoated steel sheet 1 and a second precoated steel sheet 2.

Each precoated steel sheet 1, 2 comprises two opposite main faces 5, 6, as well as at least one side face 13, extending between the two opposite main faces 5, 6, from one main face 5,6 to the other. In the example shown in FIG. 3, the precoated steel sheets 1,2 comprises four side faces 13. For example, the side faces 13 form an angle comprised between 60° and 90° with one of the main faces 5,6.

Figure 1:
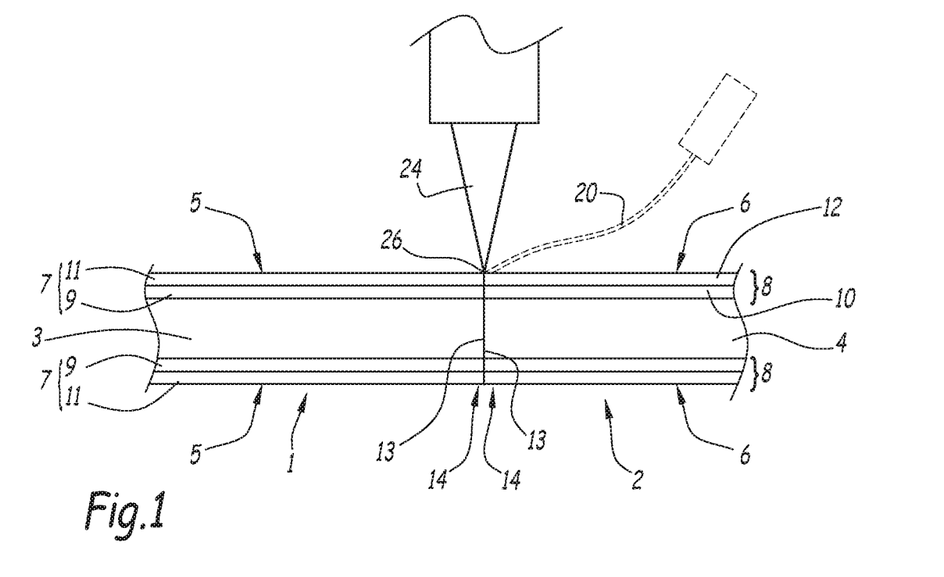
FIG. 1 is a schematic cross-sectional view of the beginning of the welding step of the method according to the present disclosure.

As shown in FIG. 1, each precoated steel sheet 1, 2 comprises a metallic substrate 3, 4 having, on at least one of its main faces, an aluminum-containing precoating 7, 8. The precoating 7, 8 is superimposed on the substrate 3, 4 and in contact therewith.

The metallic substrate 3, 4 is more particularly a steel substrate.

The steel of the substrate 3, 4 is more particularly a steel having a ferrito-perlitic microstructure.

Preferably, the substrate 3, 4 is made of a steel intended for thermal treatment, more particularly a press-hardenable steel, and for example a manganese-boron steel, such as a 22MnB5 type steel.

According to one embodiment, the steel of the substrate 3, 4 comprises, by weight:
0.10%≤C≤0.5%
0.5%≤Mn≤3%
0.1%≤Si≤1%
0.01%≤Cr≤1%
Ti≤0.2%
Al≤0.1%

S≤0.05%
P≤0.1%
B≤0.010%
the rest being iron and impurities resulting from manufacturing.

More particularly, the steel of the substrate 3, 4 comprises, by weight:
0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005%
the rest being iron and impurities resulting from manufacturing.

According to an alternative, the steel of the substrate 3, 4 comprises, by weight:
0.040%≤C≤0.100%
0.70%≤Mn≤2.00%
Si≤0.50%, and more particularly Si≤0.30%
S≤0.009%, and more particularly S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.2%
Mo≤0.100%
Ca≤0.006%,
the rest being iron and impurities resulting from manufacturing.

According to an alternative, the steel of the substrate 3, 4 comprises, by weight:
0.24%≤C≤0.38%
0.40%≤Mn≤3%
0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025%
wherein the titanium and nitrogen contents satisfy the following relationship:

Ti/N>3.42, and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05%≤Mo≤0.65%
0.001%≤W≤0.30%
0.0005%≤Ca≤0.005%
the rest being iron and impurities inevitably resulting from manufacturing.

According to an alternative, the steel of the substrate 3, 4 comprises, by weight:
0.06%≤C≤0.100%
1.4%≤Mn≤1.9%
0.2%≤Si≤0.5%
0.010%≤Al≤0.070%
0.04%≤Nb≤0.06%
3.4×N≤Ti≤8×N
0.02%≤Cr≤0.1%
0.0005%≤B≤0.004%
0.001%≤S≤0.009%
the rest being iron and impurities resulting from manufacturing.

The substrate 3, 4 may be obtained, depending on its desired thickness, by hot rolling and/or by cold-rolling followed by annealing, or by any other appropriate method.

The substrate 3, 4 advantageously has a thickness comprised between 0.6 mm and 5 mm, more particularly comprised between 0.8 mm and 5 mm, and even more particularly comprised between 1.0 mm and 2.5 mm.

According to one example, the thickness of the substrate 3 of the first precoated steel sheet 1 is different from the thickness of the substrate 4 of the second precoated steel sheet 2.

According to an alternative, the substrates 3, 4 of the first and second precoated steel sheets 1, 2 have the same thickness.

According to the present disclosure, the substrate 3 of the first precoated steel sheet 1 has, after press-hardening, an ultimate tensile strength $T_{S1}$ that is strictly greater than the ultimate tensile strength $T_{S2}$, after press-hardening, of the substrate 4 of the second precoated steel sheet 2.

In this context, "after press-hardening" means after heating to a temperature greater than or equal to the full austenitization temperature Ac3 of the considered steel substrate, hot press forming and thereafter cooling so as to obtain hardening as compared to the initial state.

For example, the ultimate tensile strength $T_{S1}$ of the substrate 3 of the first precoated steel sheet 1 after press-hardening is comprised between 1400 MPa and 1600 MPa or between 1700 MPa and 2000 MPa.

For example, the ultimate tensile strength $T_{S2}$ of the substrate 3 of the second precoated steel sheet 2 after press-hardening is comprised between 500 MPa and 700 MPa or between 1000 MPa and 1200 MPa.

For example, the ratio $$\left(\frac{T_{S1}}{T_{S2}}\right)$$

between the ultimate tensile strength $T_{S1}$ of the substrate 3 of the first precoated steel sheet 1 after press-hardening and the ultimate tensile strength $T_{S2}$ of the substrate 4 of the second precoated steel sheet 2 after press-hardening is greater than or equal to 1.2, more particularly greater than or equal to 1.4.

Furthermore, the first precoated steel sheet 1 has a first thickness $t_1$. The second precoated steel sheet 1 has a second thickness $t_2$.

The thicknesses $t_1$, $t_2$ are for example comprised between 0.6 mm and 5 mm, more particularly comprised between 0.8 mm and 5 mm, and even more particularly comprised between 1.0 mm and 2.5 mm.

According to one embodiment, the thicknesses $t_1$ and $t_2$ are identical. According to an alternative, the thicknesses $t_1$ and $t_2$ are different.

The product of the first thickness $t_1$ by the ultimate tensile strength $T_{S1}$ of the first precoated steel sheet 1 is strictly greater than the product of the second thickness $t_2$ by the ultimate tensile strength $T_{S2}$ of the second precoated steel sheet 1.

In particular, the compositions of the substrates 3 and 4 of the first and second precoated steel sheets 1, 2 are chosen among the above-described compositions.

For example, the steel of the substrate 3 of the first precoated steel sheet 1 comprises, by weight:
0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005%
the rest being iron and impurities resulting from manufacturing, According to another example, the steel of the substrate 3 of the first precoated steel sheet 1 comprises, by weight:
0.24%≤C≤0.38%
0.40%≤Mn≤3%
0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025%
wherein the titanium and nitrogen contents satisfy the following relationship:

Ti/N>3.42, and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05%≤Mo≤0.65%
0.001%≤W≤0.30%%
0.0005%≤Ca≤0.005%
the rest being iron and impurities inevitably resulting from manufacturing.

For example, the steel of the substrate 4 of the second precoated steel sheet 2 comprises, by weight:
0.040%≤C≤0.100%
0.70%≤Mn≤2.00%
Si≤0.50%, and more particularly Si≤0.30%,
S≤0.009%, and more particularly S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.2%
Mo≤0.100%
Ca≤0.006%,
the rest being iron and impurities resulting from manufacturing.

According to another example, the steel of the substrate 4 of the second precoated steel sheet 2 comprises, by weight:
0.06%≤C≤0.100%
1.4%≤Mn≤1.9%
0.2%≤Si≤0.5%
0.010%≤Al≤0.070%
0.04%≤Nb≤0.06%
3.4×N≤Ti≤8×N
0.02%≤Cr≤0.1%
0.0005%≤B≤0.004%
0.001%≤S≤0.009%
the rest being iron and impurities resulting from manufacturing.

Preferably, the carbon content of the substrate 3 of the first precoated steel sheet 1 is greater by at least 0.05 wt. % than the carbon content of the substrate 4 of the second precoated steel sheet 2.

According to the present disclosure, for at least one among the first precoated steel sheet 1 and the second precoated steel sheet 2, the aluminum-containing precoating 7, 8 comprises at least 50% by weight of aluminum.

Preferably, the precoating 7, 8 is obtained by hot-dip coating, i.e. by immersion of the substrate 3, 4 into a bath of molten metal. In this case, as shown in FIG. 1, the precoating 7, 8 comprises at least an intermetallic alloy layer 9, 10 in contact with the substrate 3, 4.

The intermetallic alloy layer 9, 10 comprises an intermetallic compound comprising at least iron and aluminum. The intermetallic alloy layer 9, 10 is in particular formed by reaction between the substrate 3, 4 and the molten metal of the bath. More particularly, the intermetallic alloy layer 9, 10 comprises intermetallic compounds of the $Fe_x$—$Al_y$ type, and more particularly $Fe_2Al_5$.

In the example shown in FIG. 1, the precoating 7, 8 further comprises a metallic alloy layer 11, 12 extending atop the intermetallic alloy layer 9, 10. The metallic alloy layer 11, 12 has a composition which is close to that of the molten metal in the bath. It is formed by the molten metal carried away by the sheet as it travels through the molten metal bath during hot-dip coating.

The metallic alloy layer 11, 12 is for example a layer of aluminum, a layer of aluminum alloy or a layer of aluminum-based alloy.

In this context, an aluminum alloy refers to an alloy comprising more than 50% by weight of aluminum. An aluminum-based alloy is an alloy in which aluminum is the main element, by weight.

For example, the metallic alloy layer 11, 12 is a layer of aluminum alloy further comprising silicon. More particularly, the metallic alloy layer 11, 12 comprises, by weight:
8%≤Si≤11%,
2%≤Fe≤4%,
the rest being aluminum and possible impurities.

The metallic alloy layer 11, 12 has, for example, a thickness comprised between 19 μm and 33 μm or between 10 μm and 20 μm.

In the example shown in FIG. 1, where the precoating 7, 8 comprises a metallic alloy layer 11, 12, the thickness of the intermetallic alloy layer 9, 10 is generally of the order of a few micrometers. In particular, its mean thickness is typically comprised between 2 and 7 micrometers.

The particular structure of the precoating 7, 8 comprising the intermetallic alloy layer 9, 10 and the metallic alloy layer 11, 12 obtained by hot-dip coating is in particular disclosed in patent EP 2 007 545.

According to another embodiment, the aluminum-containing precoating 7, 8 only comprises the intermetallic alloy layer 9, 10 as described above. In this case, the thickness of the intermetallic alloy layer 9, 10 is for example comprised between 10 μm and 40 μm. Such a precoating 7, 8 consisting of an intermetallic alloy layer 9, 10 may for example be obtained by subjecting a precoating 7, 8 comprising an intermetallic alloy layer 9, 10 and a metallic alloy layer 11, 12 as disclosed above to a pre-alloying treatment. Such a pre-alloying treatment is carried out at a temperature and for a holding time chosen so as to alloy the precoating 7, 8 with the substrate 3, 4 over at least a fraction of the thickness of the precoating 7, 8.

More particularly, the pre-alloying treatment comprises the following steps: heating the sheet to a pre-alloying temperature comprised between 620° C. and 1000° C. and holding the pre-alloyed sheet at this temperature for a time varying between a few minutes and several hours depending on the treatment temperature used. In this case, the intermetallic alloy layer 9, 10 can be itself composed of different intermetallic sublayers, such as $Fe_2Al_5$, $FeAl_3$, FeAl, $Fe_6Al_{12}Si_5$ and $FeAl_3$ sublayers.

Advantageously, as illustrated in FIG. 1, the substrate 3, 4 is provided with an aluminum-containing precoating 7, 8 as described above on both of its main faces.

The first and second precoated steel sheets 1, 2 may carry an identical precoating 7, 8.

Alternatively, the precoatings 7, 8 of the first and second precoated steel sheets 1, 2 may have a different composition.

The theoretical average content of aluminum $Al_{weld}^{th}$ a weld joint 22 obtained by butt welding between the above-described first and the second precoated steel sheets 1, 2, possibly using a filler material, is then determined.

In case a filler material is intended to be used, the filler material preferably is a steel-based filler material having an aluminum content smaller than or equal to 0.05 wt. %.

This determination is carried out in any manner known to the skilled person.

For example, the theoretical average content of aluminum in the weld joint 22 may be determined using the following formula:

$$Al_{weld}^{th} = \frac{2 \times Al_{coating}}{78 \times 100} \times \frac{M_c}{t_1 + t_2} \times (1 - \beta),$$

where $Al_{weld}^{th}$ is the theoretical average content of aluminum in the weld joint 22, in wt. %, $Al_{coating}$ is the average aluminum content in the aluminum-containing precoating 7, 8, in wt. %, $M_c$ is the weight per unit area of the aluminum-containing precoating 7, 8 on each of the two precoated steel sheets 1, 2, in g/m², β is the proportion of steel-based filler material optionally added to the weld pool, comprised between 0 and 1, where β equals zero in the case where no filler material is added to the weld pool, $t_1$ is the thickness of the first precoated steel sheet 1, in mm, and $t_2$ is the thickness of the second precoated steel sheet 2, in mm.

The above formula may be used even in the case where a filler material is used, as long as the filler material comprises an aluminum content smaller than or equal to 0.05 wt. %.

The above formula may further be used even in the case where the substrates 3, 4 comprise aluminum, as long as the aluminum content of the substrates 3, 4 is smaller than or equal to 0.05 wt. %.

The proportion β of steel-based filler material optionally added to the weld pool is for example comprised between 0 and 0.5, i.e. between 0% and 50% when the proportion is expressed in percentage.

In the case where the theoretical average content $Al_{weld}^{th}$ of aluminum in the weld joint 22 would be strictly greater than 1.25 wt. %, the method according to the present disclosure further comprises a step of preparing a weld edge 14 of at least one of the precoated steel sheets 1, 2 in such a manner that, after preparation, the theoretical average content of aluminum $Al_{weld}^{th}$ in the weld joint is comprised between 0.5 wt. % and 1.25 wt. %.

More particularly, the weld edge 14 of a considered precoated steel sheet 1, 2 is the edge of the precoated steel sheet 1, 2 that is intended to be welded to the other precoated steel sheet 1, 2.

Figure 3:
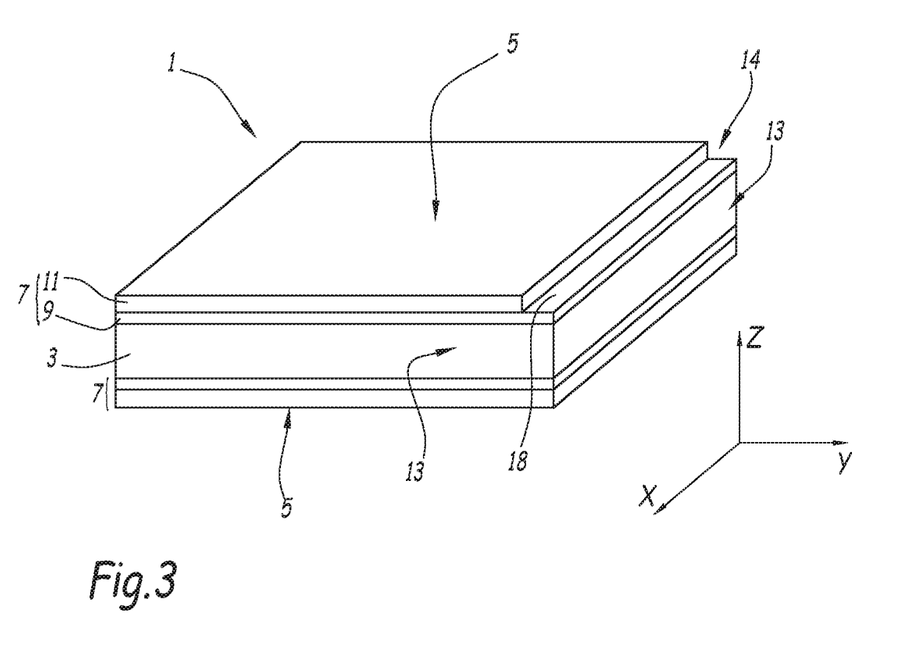
FIG. 3 is a perspective view of a precoated steel sheet after a preparation step.

As shown more particularly in FIG. 3, the weld edge 14 comprises a peripheral portion of the precoated steel sheet 1, 2 which is intended to be at least partially incorporated into the weld joint 22 during butt welding. More particularly, the weld edge 14 comprises a side face 13 of the precoated steel sheet 1, 2 and a portion of the precoated sheet 1,2 extending from this side face 13 and comprising a portion of the precoating 7,8 and a portion of the substrate 3,4.

More particularly, the step of preparing the weld edge 14 comprises removing the aluminum-containing precoating 7, 8 over at least a fraction of its thickness on at least one main face 5, 6 of at least one of the first and the second precoated steel sheets 1, 2. The precoating 7, 8 is removed over a removal zone 18 extending at the weld edge 14, from the side face 13 of the precoated steel sheet 1, 2. The removal zone 18 may extend over a width comprised between 0.5 mm and 2 mm from the side face 13 of the precoated steel sheet 1, 2. An example of a thus prepared precoated steel sheet 1 is shown in FIG. 3.

The removal is preferably carried out using a laser beam.

Advantageously, in the removal zone 18, the metallic alloy layer 11, 12 is removed, while the intermetallic alloy layer 9, 10 remains over at least a fraction of its thickness.

More particularly, in the removal zone 18, the metallic alloy layer 11, 12 is removed, while the intermetallic alloy layer 9, 10 remains intact.

The residual intermetallic alloy layer 9, 10 protects the areas of the welded blank immediately adjacent to the weld joint 22 from oxidation and decarburization during subsequent hot-forming steps, and from corrosion during the in-use service.

In the example shown in FIG. 3, the metallic alloy layer 11, 12 has been removed at the weld edge 14 over a removal zone 18, leaving the intermetallic alloy layer 9, 10 intact.

In particular, the fraction of precoating 7, 8 that is removed, as well as the number of main faces of the precoated steel sheets 1, 2 on which the precoating 7, 8 is to be removed is such that, after removal, the theoretical average content of aluminum $Al_{weld}^{th}$ in the weld joint 22 is comprised between 0.5 wt. % and 1.25 wt. %.

In particular, the precoating 7, 8 may be removed over at least a fraction of its thickness on:
- only one main face 5, 6 of the first or the second precoated steel sheet 1, 2, or
- on two main faces in total, for example on only one main face 5, 6 of each of the first and second precoated steel sheets 1, 2 or on the two main faces 5, 6 of only one among the first and second precoated steel sheets 1, 2; or
- on three main faces 5, 6 in total, i.e. on the two main faces 5, 6 of one among the first and second precoated steel sheets 1, 2 and on only one main face 5, 6 of the other precoated steel sheet 1, 2; or
- on four main faces 5, 6 in total, i.e. on the two main faces 5, 6 of the first and second precoated steel sheets 1, 2.

In the case where the theoretical average aluminum content $Al_{weld}^{th}$ in the weld joint 22 obtained by butt welding between the first and the second precoated steel sheets 1, 2 provided at the provision step, possibly using a filler material having an aluminum content smaller than or equal to 0.05 wt. %, is comprised between 0.5 wt. % and 1.25 wt. %, welding is in particular carried out on the first and second precoated steel sheets 1, 2 without prior removal of the precoating 7, 8. More particularly, in this case, welding is carried out with the first and second precoated steel sheets 1, 2 with their precoating 7, 8 intact at least on the weld edges 14.

Optionally, even in the case where the theoretical average aluminum content $Al_{weld}^{th}$ in the weld joint 22 obtained by butt welding between the first and the second precoated steel sheets 1, 2 provided at the provision step, possibly using a filler material having an aluminum content smaller than or equal to 0.05 wt. %, is comprised between 0.5 wt. % and 1.25 wt. %, and more particularly strictly greater than 0.5 wt. %, the precoating 7, 8 may be removed over at least a fraction of its thickness at the weld edge 14 on at least one main face 5, 6 of at least one of the precoated steel sheets 1, 2, and for example on only one main face 5, 6 of at least one of the two precoated steel sheets 1, 2. For example, the precoating 7, 8 is removed over at least a fraction of its thickness at the weld edge 14 on only one main face 5, 6 of each of the two precoated steel sheets 1, 2. This optional removal step is carried out in such a manner that the theoretical average aluminum content $Al_{weld}^{th}$ in the weld joint 22 obtained by welding the thus prepared first and second precoated steel sheet(s) 1, 2, possibly using a filler material containing at most 0.05 wt. % of aluminum, remains comprised between 0.5 and 1.25 wt. %.

In particular, such a removal may be carried out in order to even further decrease the heat treatment temperature $T_t$ used for the subsequent thermal treatment, the heat treatment temperature $T_t$ being determined as described later. Indeed, the austenitization temperature Ac3(WJ) of the weld joint 22 decreases with decreasing aluminum content. In particular, this optional removal step may be carried out in the case where the heat treatment temperature $T_t$ determined in the absence of removal would be strictly greater than 950° C.

Indeed, in order to maintain a good paintability and weldability, it is preferable to use heat treatment temperatures $T_t$ smaller than or equal to 950° C.

After the determination of the theoretical average aluminum content $Al_{weld}^{th}$ in the weld joint 22, and, if needed or desired, the preparation step, the method further comprises a step of butt welding the first precoated steel sheet 1 to the second precoated steel sheet 2 using laser welding so as to obtain a weld joint 22 between the first and second precoated steel sheets 1, 2 and thus obtain a welded steel blank 15.

The weld joint 22 has an aluminum content comprised between 0.5 and 1.25 wt. %.

According to one embodiment, the welding step includes the use of a filler material.

The filler material is advantageously a steel-based filler material having an aluminum content smaller than or equal to 0.05 wt. %. The filler material has a low content of aluminum so as to dilute the aluminum from the coating.

For example, the filler material further comprises austenite-forming elements so as to partially balance the ferrite-forming and/or the intermetallic compound forming effect of the aluminum from the precoating 7, 8.

The filler material is, for example, a filler wire or powder.

The proportion of filler material added to the weld pool is for example comprised between 0 and 0.5.

According to one example, the filler material has the following composition, by weight:
0.1% ≤ C ≤ 1.2%
0.01% ≤ Mn ≤ 10%
0.02% ≤ Ni ≤ 7%
0.02% ≤ Cr ≤ 5%
0.01% ≤ Si ≤ 2%
optionally:
traces ≤ Mo ≤ 1%
traces ≤ Ti ≤ 0.1%
traces ≤ V ≤ 0.1%
traces ≤ B ≤ 0.01%
traces ≤ Nb ≤ 0.1%
traces ≤ Al ≤ 0.05%
the rest being iron and impurities inevitably resulting from manufacturing.

According to particular examples, the filler material may have one of the compositions W1, W2 or W3 described in Table 1 below.

TABLE 1

Compositions of filler wires

|    | % C  | % Mn | % Al | % Ni | % Cr | % Si | % Mo  | % Ti  | % B   |
|----|------|------|------|------|------|------|-------|-------|-------|
| W1 | 0.29 | 0.85 | 0.03 | 0.1  | 0.15 | 0.15 | 0.025 | 0.035 | 0.004 |
| W2 | 0.70 | 2.00 | 0.03 | —    | 1.0  | 0.40 | —     | 0.2   | —     |
| W3 | 0.10 | 3.61 | 0.03 | 1.84 | 0.36 | 0.68 | 0.45  | —     | —     |

In all these compositions, the contents are expressed in weight percent.

Furthermore, for each of the compositions, the rest of the composition is iron and unavoidable impurities.

In the above Table 1, "—" means that the composition comprises at most traces of the element.

According to a variant, the welding step is an autogenous welding step, which means that the welding is carried out without using a filler material. In this case, the composition of the weld joint 22 depends only on the composition of the substrates 3, 4 of the first and second precoated steel sheets 1, 2 and on the amount of precoating 7, 8 incorporated into the weld joint 22.

The welding operation results in the formation of a weld joint 22 at the junction between the two sheets 1, 2.

The welding step is a laser welding step, in which a laser beam 24 is directed towards the junction between the two precoated steel sheets 1, 2.

The laser welding step is for example carried out using a $CO_2$ laser or a solid state laser or a semi-conductor laser.

The laser source is preferably a high-power laser source. It may be for example be selected from among a $CO_2$ laser with a wavelength of 10 micrometers, a solid state laser source with a wavelength of 1 micrometer or a semi-conductor laser source, for example a diode laser with a wavelength comprised between 0.8 and 1 micrometers.

The power of the laser is chosen depending on the thickness of the first and second precoated steel sheets 1, 2. In particular, the power is chosen so as to allow the fusion of the weld edges 14 of the precoated steel sheets 1, 2, as well as a sufficient mixing in the weld joint 22. For a $CO_2$ laser, the laser power is for example comprised between 3 and 12 kW. For a solid state laser or a semi-conductor laser, the laser power is for example comprised between 2 and 8 kW.

The diameter of the laser beam 24 at the point of its impact 26 on the precoated steel sheets 1, 2 may be equal to about 600 μm for both types of laser sources.

During the welding step, the welding is for example carried out under a protective atmosphere. Such a protective atmosphere in particular prevents the oxidation and decarburization of the area where the weld is being performed, the formation of boron nitride in the weld joint 22 and possible cold cracking due to hydrogen absorption.

The protective atmosphere is, for example, formed by an inert gas or a mixture of inert gases. The inert gases may be helium or argon or a mixture of these gases.

The welding may be carried out using the laser beam as the only heat source.

Optionally, the laser welding step includes, in addition to the laser beam, an additional heat source, such as, for example, an electric arc or an induction heating. This additional heat source contributes to melt the edges of the first and second precoated steel sheets 1, 2 in order to form the weld joint 22.

Optionally, the welding step comprises the use of a filler wire 20, as shown in dashed lines in FIG. 1. In this case, the laser beam 24 is additionally configured for melting the filler wire 20 at the point of impact 26 of the laser beam 24.

During the welding step, the distance between the facing weld edges 14 of the two precoated steel sheets 1, 2 is for example smaller than or equal to 0.3 mm, and more particularly smaller than or equal to 0.1 mm. Providing such a clearance between the facing weld edges 14 of the two sheets 1, 2 promotes the deposition of the material from a possible filler wire 20 during the welding operation and prevents the forming of an over-thickness at the weld joint 22.

Figure 2:
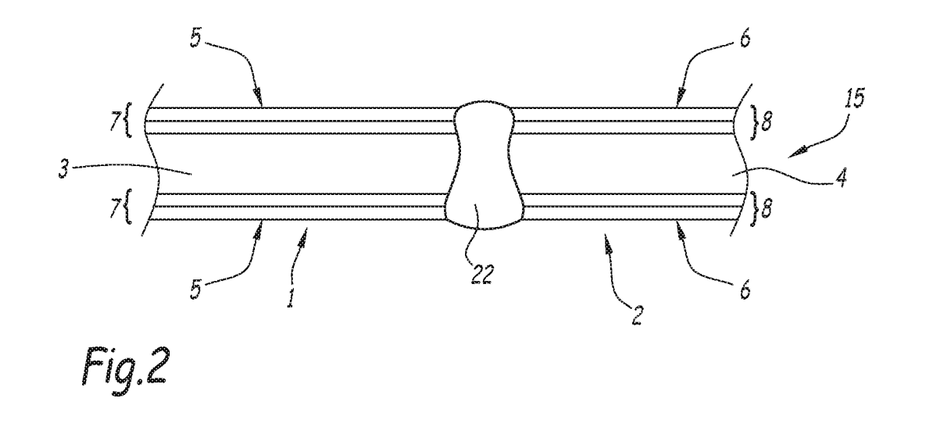
FIG. 2 is a schematic cross-sectional view of a welded blank obtained at the end of the welding step.

At the end of the welding step, a welded steel blank 15 as shown in FIG. 2 is obtained.

After the welding step, the method according to the present disclosure comprises a step of heating the thus obtained welded steel blank 15 in a heat treatment oven.

More particularly, the heating step comprises heating the welded steel blank 15 to a heat treatment temperature $T_t$.

According to the present disclosure, the heat treatment temperature $T_t$ is at least 10° C. lower than the full austenitization temperature Ac3(WJ) of the weld joint 22.

The full austenitization temperature Ac3(WJ) of the weld joint 22, in ° C., is for example determined from the composition of the weld joint 22 using the following formula:

Ac3(WJ)=102.2×Al+439×C+181.9×Mn+364.1×Si+148×Al$^2$−425.2×C$^2$−29.2×Mn$^2$−497.8×Si$^2$−400×Al×C+9.9×Al×Mn−50.5×Al×Si−208.9×C×Mn+570.3, where Al, C, Mn and Si refers, respectively, to the content of aluminum, carbon, manganese and silicon in the weld joint 22, in wt %.

The above formula for Ac3(WJ) may be used in the content ranges expressed in Table 2 below:

TABLE 2

| Content ranges for Ac3 formula | | |
|---|---|---|
| | % Min | % Max |
| C | 0.05 | 0.35 |
| Mn | 0.1 | 5 |
| Si | 0.1 | 0.5 |
| Al | 0.03 | 1.5 |
| Cr | 0.01 | 2 |
| Ni | — | 2 |
| Ti | 0.001 | 0.2 |
| Nb | 0.001 | 0.1 |
| Mo | — | 0.1 |
| Cu | 0.001 | 0.1 |
| B | — | 0.004 |
| N | — | 0.01 |
| Ca | — | 0.006 |
| W | — | 0.30 |
| S | — | 0.05 |
| P | — | 0.1 |

In the above Table 2:
all the contents are expressed in percentage by weight.
"-" means that there is no lower limit.

According to the present disclosure, the heat treatment temperature $T_t$ is further greater by at least 15° C. than a minimum temperature $T_{min}$. In this context, the minimum temperature $T_{min}$, is defined as follows:

$$T_{min}(° C.) = AC3(WJ) - \frac{\alpha_{IC}^{max}}{100}(Ac3(WJ) - 673 - 40 \times Al)$$

where
Ac3(WJ) is the full austenitization temperature of the weld joint 22, in ° C.,
Al is the content of aluminum in the weld joint 22, in wt. %, and $$\alpha_{IC}^{max} = \left(1 - \frac{(1+\rho)(\max(1;\rho)Ts_2 - 350)}{(1-\beta)(\rho Ts_2 + Ts_1) + \beta(1+\rho)(3130C^{FW} + 750) - 350 \times (1+\rho)}\right) \times 100$$

where
$T_{S1}$ is the ultimate tensile strength of the strongest substrate 3 after press-hardening, in MPa
$T_{S2}$ is the ultimate tensile strength of the weakest substrate 4 after press-hardening, in MPa β is the proportion of filler material added to the weld pool, comprised between 0 and 1

$C^{FW}$ is the carbon content of the filler material, in wt. %

ρ is the ratio between the thickness of the precoated steel sheet 2 comprising the weakest substrate 4 and the thickness of the precoated steel sheet 1 comprising the strongest substrate 3 ($\rho = t_2/t_1$).

In this context, a substrate is weaker than the other one if it has a lower ultimate tensile strength Ts, after press-hardening.

The minimum temperature $T_{min}$ can therefore be calculated based on:
- the chemical composition of the weld joint 22,
- the properties of the substrates 3,4 of the precoated steel sheets 1, 2,
- in the case where a filler material is used, the proportion and composition of the filler material.

The step of heating the welded blank 15 further includes a step of holding the welded steel blank 15 at the heat treatment temperature $T_t$ for a time comprised between 2 and 10 minutes.

At the end of the heating step, since the welded steel blank 15 has been heated to a temperature which is at least 10° C. lower than the full austenitization temperature Ac3(WJ) of the weld joint 22, the microstructure of the weld joint 22 is not entirely austenitic. The fraction of intercritical ferrite in the weld joint 22 depends on the temperature difference between the heat treatment temperature $T_t$ and the full austenitization temperature Ac3(WJ) of the weld joint 22. In particular, at the end of the heating step, the fraction of intercritical ferrite $\alpha_{IC}$ in the weld joint 22 is greater than or equal to 15% and lower by at least 5% than a maximum intercritical ferrite fraction $\alpha_{IC}^{max}$ ($15\% \leq \alpha_{IC} \leq \alpha_{IC}^{max} - 5\%$).

The maximum intercritical ferrite fraction $\alpha_{IC}^{max}$, in %, may be determined using the following formula:

$$\alpha_{IC}^{max} = \left(1 - \frac{(1+\rho)(\max(1;\rho)Ts_2 - 350)}{(1-\beta)(\rho Ts_2 + Ts_1) + \beta(1+\rho)(3130C^{FW} + 750) - 350(1+\rho)}\right) \times 100,$$

where $T_{S1}$ is the ultimate tensile strength of the strongest substrate 3 after press-hardening, in MPa $T_{S2}$ is the ultimate tensile strength of the weakest substrate 4 after press-hardening, in MPa β is the proportion of filler material added to the weld pool, comprised between 0 and 1

$C^{FW}$ is the carbon content of the filler material, in wt. %

ρ is the ratio between the thickness of the precoated steel sheet 2 comprising the weakest substrate 4 and the thickness of the precoated steel sheet 1 comprising the strongest substrate 3 ($\rho = t_2/t_1$).

As is known to the skilled person, the intercritical ferrite fraction can be measured for example by direct quenching of the welded blank 15 after heating to the heat treatment temperature $T_t$. After adapted Nital etching, the intercritical ferrite appears as a pale constituent over a greyish martensite matrix.

The intercritical ferrite fraction in the weld joint 22 may also be determined through analysis of a manganese elemental mapping image of a sample, showing the distribution of the manganese content in the sample. Such a mapping image may for example be obtained by analysis of a sample through electron probe micro-analysis (EPMA). In this Mn mapping image, the areas exhibiting Mn content minima coincide with the intercritical ferrite areas, while the areas having a higher Mn content correspond to the phases resulting from the transformation of the austenite formed during intercritical annealing. Therefore, the surface fraction of intercritical ferrite corresponds to the surface fraction of the areas of Mn content minima in this image. This method is, for example, described in the document Hanlon, D; Rijkenberg, A; Leunis, E et al: Quantitative phase analysis of multi-phase steels, PHAST (2007), ISBN 92-79-02658-5, pages 77-79. Indeed, it is known that, during intercritical annealing, a partitioning of the manganese occurs between the austenite and the ferrite, the manganese migrating from the ferrite to the austenite such that, at the end of the intercritical annealing, the Mn content of the intercritical ferrite is strictly smaller than the Mn content of the austenite. The phases that are formed from the austenite during subsequent cooling, such as martensite, transformation ferrite and/or bainite, inherit the Mn content of the austenite, while the intercritical ferrite retains its lower Mn content resulting from the partitioning. Therefore, on the Mn elemental mapping image, the intercritical ferrite can be distinguished from other phases, and in particular from other types of ferrite, and corresponds to the areas in which the Mn content is minimum.

In the context of this patent application, all the fractions relating to the microstructure are expressed in surface percent.

At the end of the heating step, the microstructure of the substrates 3, 4 of the first and second precoated steel sheets 1, 2 is entirely austenitic. In particular, due to the presence of aluminum from the precoating 5, 6 on the weld edges 14 of the precoated steel sheets 1, 2 at the time of welding, the full austenitization temperature Ac3 of the substrates 3, 4 is strictly lower than the full austenitization temperature Ac3 (WJ) of the weld joint 22.

At the end of the heating step, the welded steel blank 15 is hot formed in a press into a steel part in a press-forming tool. For example, the welded steel blank 15 is formed into the steel part by hot stamping using an adapted hot stamping tool.

Preferably, the transfer time between the heat treatment oven and the press-forming tool is smaller than or equal to 10 seconds. It is for example comprised between 5 and 10 seconds. The transfer time is chosen to be as short as possible in order to avoid metallurgical transformations in the welded blank 15, in particular the formation of ferrite, prior to hot forming.

The thus formed steel part is then cooled with a cooling speed greater than or equal to the critical martensitic or bainitic cooling speed of the most hardenable substrate 3, 4 among the substrates 3, 4 of the first and second precoated steel sheets 1, 2.

Advantageously, the cooling step is carried out in the press-forming tool, for example by using a forming tool provided with a cooling system, comprising, for example, cooling channels formed in the press-forming tool.

According to the present disclosure, at the end of the cooling step, the weld joint 22 has a microstructure comprising martensite and/or bainite and an intercritical ferrite fraction $\alpha_{IC}$ greater than or equal to 15% and lower by at least 5% than a maximum intercritical ferrite fraction $\alpha_{IC}^{max}$ ($15\% \leq \alpha_{IC} \leq \alpha_{IC}^{max} - 5\%$). The maximum intercritical ferrite fraction $\alpha_{IC}^{max}$ may be determined as explained above.

At the end of the cooling step, at least one among the substrates 3, 4 has a mainly martensitic and/or bainitic microstructure. The martensite and/or the bainite result from the transformation, during the cooling step, of the austenite formed during the heating step.

According to one example, both substrates 3, 4 have a mainly martensitic and/or bainitic structure.

In this context, "mainly" means that the microstructure consists of martensite and/or bainite and at most 5% of ferrite.

The present disclosure also relates to a press-hardened laser welded steel part obtained using the method described above.

The part is in particular a crash management part, for example an anti-intrusion part or a shock absorbing part, a structural part or a part that contributes to the safety of a motor vehicle.

The press-hardened laser welded steel part comprises a first coated steel part portion and a second coated steel part portion joined by a weld joint 22 as described above.

More particularly, the first coated steel part portion and the second coated steel part portion respectively result from the hot press-forming and cooling in the press-forming tool of the first and second precoated steel sheets 1, 2.

More particularly, each coated steel part portion comprises a steel substrate having, on at least one of its main faces, an aluminum-containing coating comprising iron and at least 30 wt. % of aluminum.

In particular, the aluminum-containing coating of the first and second steel part portions results from the at least partial alloying of the precoating 7, 8 during the hot-press forming.

The substrates of the first and second steel part portions have the compositions described above for the precoated steel sheets 1,2. They result from the hot press-forming and cooling of the substrates 3,4 of the precoated steel sheets 1,2.

The substrate of the first coated steel part portion has an ultimate tensile strength $T_{S1}$ strictly greater than the ultimate tensile strength $T_{S2}$ of the substrate of the second coated steel part portion.

For example, the first coated steel part portion has a first thickness and the second coated steel part portion has a second thickness, and the product of the first thickness by the ultimate tensile strength of the first coated steel part portion is strictly greater than the product of the second thickness by the ultimate tensile strength $T_{S2}$ of the second coated steel part portion.

The weld joint 22 has an aluminum content comprised between 0.5 wt. % and 1.25 wt. %.

The weld joint 22 has a microstructure comprising martensite and/or bainite and an intercritical ferrite fraction $\alpha_{IC}$ greater than or equal to 15% and lower by at least 5% than a maximum intercritical ferrite fraction $\alpha_{IC}^{max}$ ($15\% \leq \alpha_{IC} \leq \alpha_{IC}^{max} - 5\%$).

The maximum intercritical ferrite fraction $\alpha_{IC}^{max}$ may be determined as explained above.

On the press-hardened laser welded steel part, the proportion $\beta$ of filler material added to the weld pool during the welding operation may be determined by measuring the content of aluminum $Al_{weld}$ the weld joint 22 through any adapted method. Knowing the content $Al_{coating}$ of aluminum in the coatings of the welded steel sheets, and considering that the amount of aluminum in the filler material is negligible, the proportion $\beta$ may be calculated using the formula:

$$\beta = 1 - \left( Al_{weld} \times \frac{78 \times 100}{2 \times Al_{coating}} \times \frac{t1 + t2}{M_c} \right),$$

based on the formula $$Al_{weld} = \frac{2 \times Al_{coating}}{78 \times 100} \times \frac{M_c}{t_1 + t_2} \times (1 - \beta)$$

described above. The carbon content $C^{FW}$ of the filler material may then be determined based on the carbon contents of the substrates 3, 4, the proportion $\Phi$ of filler material determined based on the aluminum content of the weld joint 22, and the measured content of carbon in the weld joint 22.

The ultimate tensile strength of the weld joint 22 is greater than or equal to that of the weakest substrate 4 after press-hardening.

The steel on at least one side of the weld joint 22, corresponding to the steel of at least the first substrate 3, has a mainly martensitic and/or bainitic structure. For example, the steel on either side of the weld joint 22, corresponding to the steel of the first substrate 3 and of the second substrate 4 has a mainly martensitic and/or bainitic structure.

The inventors of the present disclosure have found out, surprisingly, that when the welded blank 15 is subjected to a heat treatment under the above-described conditions, the ultimate tensile strength of the weld joint 22 will be strictly greater than the ultimate tensile strength of the substrate 4 of the second precoated steel sheet 2, i.e. the substrate having the lowest ultimate tensile strength. Therefore, when subjected to a tensile test in a direction perpendicular to the weld joint 22, the part obtained after the above-described heat treatment does not fail in the weld joint 22, even though the structure of the weld joint 22 after heat treatment is not entirely martensitic or bainitic.

Therefore, the method according to the present disclosure is particularly advantageous, since it allows obtaining satisfactory mechanical properties at reduced cost. Indeed, when welding together precoated steel sheets comprising an aluminum-containing precoating, it is no longer necessary to tailor the composition of the weld joint in such a manner that the full austenitization temperature of the weld joint is smaller than or equal to that of the substrates, for example by removing the precoating on both sides of the precoated steel sheets or by adding high amounts of austenite-forming elements into the weld using a filler material such as a filler wire. In particular, avoiding a removal of the precoating on both faces of the steel sheets reduces the total processing time. Furthermore, reducing the amount of austenite-forming elements that have to be added through a filler material or even avoiding the use of a filler material entirely reduces the production cost, and prevents issues resulting from the addition of a high proportion of filler material, in particular relating to the geometry of the weld joint and to the obtention of a homogeneous mix between the material from the precoated steel sheets and from the filler material in the weld joint.

The inventors of the present invention have carried out experiments E1 to E36 in which welded steel blanks 15 were produced using precoated steel sheets 1, 2. Each precoated steel sheet 1, 2 has a substrate 3, 4 having the composition described below (see Table 5), and, on both main faces, a precoating 7, 8 formed by hot dip coating, the precoating 7, 8 comprising a metal alloy layer 11, 12 comprising 88 wt. % of aluminum, 10 wt. % of silicon and 2% of iron.

The total weight per unit area of the precoating 7, 8 on both main faces of each precoated steel sheet 1, 2, prior to any removal step, was 150 g/m².

After removal of the metal alloy layer 11, 12 on only one of the main faces 5, 6 of the precoated steel sheets 1, 2, leaving the intermetallic alloy layer 9, 10 intact, the total weight per unit area of the residual precoating 7, 8 on each of the precoated steel sheets 1, 2 was 100 g/m².

The compositions of the substrates used for the experiments are disclosed in the Table 3 below. The compositions of the filler wires used for the experiments are disclosed in Table 4 below.

TABLE 3

Compositions of the substrates used in the experiments

|    | % C  | % Mn | % Al  | % Ni | % Cr  | % Si  | % Mo | % Ti  | % B   | % Nb  | % S   | % P   |
|----|------|------|-------|------|-------|-------|------|-------|-------|-------|-------|-------|
| S1 | 0.22 | 1.22 | 0.043 | 0.02 | 0.228 | 0.304 | —    | 0.050 | 0.003 | 0.003 | 0.001 | 0.015 |
| S2 | 0.07 | 1.60 | 0.038 | 0.01 | 0.071 | 0.443 | —    | 0.022 | 0.004 | 0.054 | 0.001 | 0.007 |
| S3 | 0.07 | 1.57 | 0.022 | —    | 0.003 | 0.041 | —    | 0.081 | —     | 0.046 | 0.002 | 0.014 |

TABLE 4

Compositions of the filler wires used in the experiments

|    | % C  | % Mn | % Al | % Ni | % Cr | % Si | % Mo  | % Ti  | % B   |
|----|------|------|------|------|------|------|-------|-------|-------|
| W1 | 0.29 | 0.85 | 0.03 | 0.1  | 0.15 | 0.15 | 0.025 | 0.035 | 0.004 |
| W2 | 0.70 | 2.00 | 0.03 | —    | 1.0  | 0.40 | —     | 0.2   | —     |
| W3 | 0.10 | 3.61 | 0.03 | 1.84 | 0.36 | 0.68 | 0.45  | —     | —     |

In the above Tables 3 and 4, the compositions are expressed in weight percent.

Furthermore, for each of the compositions in Tables 3 and 4, the rest of the composition is iron and unavoidable impurities.

"-" means that the composition comprises at most traces of the element.

The full austenitization temperatures Ac3 and the ultimate tensile strengths Ts of the above substrates S1, S2 and S3 are as follows:

S1: 834° C.; Ts=1500 MPa
S2: 858° C.; Ts=1050 MPa
S3: 806° C.; Ts=700 MPa

The precoated steel sheets 1, 2 were butt laser welded, using a disk laser with a power of 5.6 kW or a YAG laser with a power of 4 kW.

In all the examples, a protective atmosphere consisting of helium or argon was used in order to avoid oxidation and decarburization of the area where the weld is being performed, as well as the formation of boron nitride in the weld joint and possible cold cracking due to hydrogen absorption. The flow rate of the gas was greater than or equal to 15 l/min.

The welded blanks 1 were then subjected to a thermal treatment including heating to a heat treatment temperature $T_t$ of 920° C. and holding at this temperature for six minutes, transferring the blank to the hot press-forming tool with a transfer time chosen so as to prevent the formation of ferrite between the heating oven and the hot forming tool and then cooling in the press-forming tool for one minute at a cooling speed greater than or equal to 30° C./s so as to obtain a press-hardened blank.

The experimental conditions used for experiments E1 to E36 are summarized in Tables 5 and 6 below.

Tensile specimens were then cut from the thus obtained heat treated blanks in a direction perpendicular to the weld joint.

Tensile testing was carried out at ambient temperature (about 20° C.) using the method disclosed in the following standards: NF EN ISO 4136 and NF ISO 6892-1 on a longitudinal tensile specimen of the type EN 12.5×50 (240× 30 mm), extracted parallel to the rolling direction. For each heat treated welded blank, 5 tensile tests were carried out.

The results of the tensile testing are indicated in the column entitled "Failure location" in the Table 6 below, which indicates the location at which the failure occurred during tensile testing.

In this column:

"BM" refers to a failure in the base metal, i.e. in the substrate of one of the precoated sheets, "Weld" refers to a failure in the weld joint; and "Mix" refers to cases where some of the tensile specimens failed in the weld joint while others failed in the base metal.

TABLE 5

Experimental conditions

| Experiment | Substrate of the first precoated steel sheet | Thickness $t_1$ of the first precoated steel sheet (mm) | Substrate of the second precoated steel sheet | Thickness t2 of the second precoated steel sheet (mm) | ρ ($t_2/t_1$) | $Ts_1 x t_1 - Ts_2 x t_2$ (mm · MPa) | Filler wire | Filler wire proportion (%) | Precoating weight per unit area at the time of butt welding (g/m²) | Calculated aluminum content in the obtained weld joint (in wt. %) |
|---|---|---|---|---|---|---|---|---|---|---|
| E1 | S1 | 1.5 | S3 | 1.5 | 1.00 | 1200 | W1 | 10 | 150 | 1.02 |
| E2 | S1 | 2.0 | S3 | 1.5 | 0.75 | 1950 | W1 | 10 | 150 | 0.87 |

TABLE 5-continued

Experimental conditions

| Experiment | Substrate of the first precoated steel sheet | Thickness $t_1$ of the first precoated steel sheet (mm) | Substrate of the second precoated steel sheet | Thickness $t_2$ of the second precoated steel sheet (mm) | $\rho$ ($t_2/t_1$) | $Ts_1 xt_1 - Ts_2 xt_2$ (mm·MPa) | Filler wire | Filler wire proportion (%) | Precoating weight per unit area at the time of butt welding (g/m²) | Calculated aluminum content in the obtained weld joint (in wt. %) |
|---|---|---|---|---|---|---|---|---|---|---|
| E3 | S1 | 1.2 | S3 | 1.5 | 1.25 | 750 | W1 | 10 | 150 | 1.13 |
| E̅4̅ | S1 | 1.2 | S3 | 1.5 | 1.25 | 750 | W1 | 20 | 150 | 1.00 |
| E̅5̅ | S1 | 1.2 | S3 | 1.5 | 1.25 | 750 | W1 | 30 | 150 | 0.88 |
| E6 | S1 | 1.2 | S3 | 1.5 | 1.25 | 750 | W2 | 10 | 150 | 1.13 |
| E̅7̅ | S1 | 1.2 | S3 | 1.5 | 1.25 | 750 | — | 0 | 150 | 1.25 |
| E̅8̅ | S1 | 1.2 | S3 | 1.5 | 1.25 | 750 | — | 0 | 100 | 0.84 |
| E̅9̅ | S1 | 1.0 | S3 | 1.0 | 1.00 | 800 | W1 | 25 | 150 | 1.27 |
| E̅1̅0̅ | S1 | 1.5 | S3 | 1.5 | 1.00 | 1200 | W1 | 25 | 150 | 0.85 |
| E11 | S1 | 1.2 | S3 | 1.5 | 1.25 | 750 | W1 | 25 | 150 | 0.94 |
| E̅1̅2̅ | S1 | 2.0 | S3 | 1.5 | 0.75 | 1950 | W1 | 25 | 150 | 0.73 |
| E13 | S1 | 1.5 | S3 | 2.0 | 1.33 | 850 | W1 | 25 | 150 | 0.73 |
| E14 | S1 | 1.5 | S3 | 2.5 | 1.67 | 500 | W1 | 25 | 150 | 0.63 |
| E̅1̅5̅ | S1 | 1.2 | S3 | 2.5 | 2.08 | 50 | W1 | 25 | 150 | 0.69 |
| E̅1̅6̅ | S1 | 1.5 | S3 | 1.0 | 0.67 | 1550 | W1 | 25 | 150 | 1.02 |
| E17 | S1 | 1.6 | S2 | 1.2 | 0.75 | 1140 | — | 0 | 100 | 0.81 |
| E̅1̅8̅ | S1 | 1.6 | S2 | 1.2 | 0.75 | 1140 | W1 | 25 | 100 | 0.60 |
| E19 | S1 | 1.6 | S2 | 1.2 | 0.75 | 1140 | — | 0 | 150 | 1.21 |
| E̅2̅0̅ | S1 | 1.6 | S2 | 1.2 | 0.75 | 1140 | W1 | 25 | 150 | 0.91 |
| E̅2̅1̅ | S1 | 1.2 | S2 | 1.0 | 0.83 | 750 | — | 0 | 100 | 1.03 |
| E̅2̅2̅ | S1 | 1.2 | S2 | 1.0 | 0.83 | 750 | W1 | 25 | 100 | 0.77 |
| E23 | S1 | 1.2 | S2 | 1.0 | 0.83 | 750 | — | 0 | 150 | 1.54 |
| E̅2̅4̅ | S1 | 1.2 | S2 | 1.0 | 0.83 | 750 | W1 | 25 | 150 | 1.15 |
| E̅2̅5̅ | S1 | 1.0 | S3 | 1.0 | 1.00 | 800 | W3 | 15 | 150 | 1.44 |
| E̅2̅6̅ | S1 | 1.0 | S3 | 1.0 | 1.00 | 800 | W3 | 30 | 150 | 1.18 |
| E̅2̅7̅ | S1 | 1.2 | S3 | 1.2 | 1.00 | 960 | W3 | 15 | 150 | 1.20 |
| E̅2̅8̅ | S1 | 1.2 | S3 | 1.2 | 1.00 | 960 | W3 | 30 | 150 | 0.99 |
| E̅2̅9̅ | S1 | 1.5 | S3 | 1.5 | 1.00 | 1200 | W3 | 15 | 150 | 0.96 |
| E30 | S1 | 1.5 | S3 | 1.5 | 1.00 | 1200 | W3 | 30 | 150 | 0.79 |
| E31 | S1 | 2.0 | S3 | 2.0 | 1.00 | 1600 | W3 | 15 | 150 | 0.72 |
| E32 | S1 | 2.0 | S3 | 2.0 | 1.00 | 1600 | W3 | 30 | 150 | 0.59 |
| E33 | S1 | 1.0 | S3 | 1.5 | 1.50 | 450 | W3 | 15 | 150 | 1.15 |
| E̅3̅4̅ | S1 | 1.0 | S3 | 1.5 | 1.50 | 450 | W3 | 30 | 150 | 0.95 |
| E̅3̅5̅ | S1 | 1.7 | S3 | 2.5 | 1.47 | 800 | W3 | 15 | 150 | 0.68 |
| E̅3̅6̅ | S1 | 1.7 | S3 | 2.5 | 1.47 | 800 | W3 | 30 | 150 | 0.56 |

In the above Table 5, a precoating weight of 150 g/m² corresponds to a case in which no preparation step has been carried out prior to welding, i.e. the precoating remains intact on both main faces of the precoated steel sheets at the time of welding, whereas a precoating weight of 100 g/m² corresponds to a case in which the precoated steel sheets have been prepared prior to welding by removing the metallic alloy layer 11, 12 on only one main face of each of the precoated steel sheets 1, 2, leaving the intermetallic alloy layer 9, 10 intact.

TABLE 6

Experimental conditions (continued) and test results

| Experiment | $T_{min}$ (° C.) + 15° C. | $T_t$ (° C.) | Ac3 (WJ) (° C.) −10° C. | $T_{min}$ (° C.) + 15° C. ≤ $T_t$ (° C.) ≤ Ac3(WJ) (° C.) −10° C.? | Failure location | $\alpha_{IC}^{max}$ (%) | $\alpha_{IC}$ (obtained at $T_t$) (%) + 5% | $\alpha_{IC}$ (obtained at $T_t$) + 5% ≤ $\alpha_{IC}^{maxo}$? |
|---|---|---|---|---|---|---|---|---|
| E1 | 892 | 920 | 1072 | Yes | BM | 57 | 50 | Yes |
| E2 | 853 | 920 | 1009 | Yes | BM | 59 | 3̅7̅ | Yes |
| E3 | 1022 | 920 | 1128 | No | Weld | 32 | 5̅8̅ | No |
| E̅4̅ | 954 | 9̅2̅0̅ | 1058 | N̅o̅ | W̅e̅l̅d̅ | 37 | 4̅8̅ | N̅o̅ |
| E5 | 899 | 9̅2̅0̅ | 995 | Y̅e̅s̅ | B̅M̅ | 42 | 3̅4̅ | Y̅e̅s̅ |
| E6 | 1005 | 9̅2̅0̅ | 1119 | N̅o̅ | Weld | 34 | 5̅7̅ | N̅o̅ |
| E̅7̅ | 1107 | 9̅2̅0̅ | 1207 | N̅o̅ | Weld | 26 | 6̅6̅ | N̅o̅ |
| E̅8̅ | 956 | 9̅2̅0̅ | 1010 | N̅o̅ | W̅e̅l̅d̅ | 26 | 3̅8̅ | N̅o̅ |
| E̅9̅ | 924 | 9̅2̅0̅ | 1178 | N̅o̅ | M̅i̅x̅ | 61 | 6̅4̅ | N̅o̅ |
| E̅1̅0̅ | 838 | 920 | 987 | Yes | B̅M̅ | 61 | 3̅2̅ | Yes |
| E11 | 925 | 920 | 1025 | No | Mix | 39 | 4̅1̅ | No |
| E̅1̅2̅ | 814 | 9̅2̅0̅ | 943 | Y̅e̅s̅ | B̅M̅ | 63 | 1̅8̅ | Y̅e̅s̅ |
| E13 | 892 | 920 | 946 | Yes | BM | 32 | 1̅9̅ | Yes |
| E14 | 941 | 920 | 919 | No | Weld | 1 | 0̅9̅ | No |
| E̅1̅5̅ | 1055 | 9̅2̅0̅ | 935 | N̅o̅ | W̅e̅l̅d̅ | 0 | 1̅5̅ | N̅o̅ |
| E̅1̅6̅ | 860 | 9̅2̅0̅ | 1051 | Y̅e̅s̅ | B̅M̅ | 64 | 4̅6̅ | Y̅e̅s̅ |

TABLE 6-continued

Experimental conditions (continued) and test results

| Experiment | $T_{min}$ (° C.) + 15° C. | $T_t$ (° C.) | Ac3 (WJ) (° C.) −10° C. | $T_{min}$ (° C.) + 15° C. ≤ $T_t$ (° C.) ≤ Ac3(WJ) (° C.) −10° C.? | Failure location | $\alpha_{IC}^{max}$ (%) | $\alpha_{IC}$ (obtained at $T_t$) (%) + 5% | $\alpha_{IC}$ (obtained at $T_t$) + 5% ≤ $\alpha_{IC}^{max}$? |
|---|---|---|---|---|---|---|---|---|
| E17 | 958 | 920 | 1004 | No | Weld | 23 | 36 | No |
| <u>E18</u> | <u>876</u> | <u>920</u> | <u>920</u> | <u>Yes</u> | <u>BM</u> | <u>30</u> | <u>09</u> | <u>Yes</u> |
| E19 | 1098 | 920 | 1181 | No | Weld | 23 | 63 | No |
| <u>E20</u> | <u>950</u> | <u>920</u> | <u>1019</u> | <u>No</u> | <u>Mix</u> | <u>30</u> | <u>40</u> | <u>No</u> |
| <u>E21</u> | <u>1034</u> | <u>920</u> | <u>1095</u> | <u>No</u> | <u>Weld</u> | <u>23</u> | <u>53</u> | <u>No</u> |
| <u>E22</u> | <u>916</u> | <u>920</u> | <u>971</u> | <u>Yes</u> | <u>BM</u> | <u>29</u> | <u>27</u> | <u>Yes</u> |
| E23 | 1255 | 920 | 1375 | No | Weld | 23 | 78 | No |
| <u>E24</u> | <u>1032</u> | <u>920</u> | <u>1128</u> | <u>No</u> | <u>Mix</u> | <u>29</u> | <u>58</u> | <u>No</u> |
| <u>E25</u> | <u>1044</u> | <u>920</u> | <u>1346</u> | <u>No</u> | <u>Weld</u> | <u>53</u> | <u>76</u> | <u>No</u> |
| <u>E26</u> | <u>983</u> | <u>920</u> | <u>1225</u> | <u>No</u> | <u>Weld</u> | <u>53</u> | <u>67</u> | <u>No</u> |
| <u>E27</u> | <u>974</u> | <u>920</u> | <u>1208</u> | <u>No</u> | <u>Weld</u> | <u>53</u> | <u>66</u> | <u>No</u> |
| <u>E28</u> | <u>933</u> | <u>920</u> | <u>1129</u> | <u>No</u> | <u>Mix</u> | <u>53</u> | <u>57</u> | <u>No</u> |
| <u>E29</u> | <u>914</u> | <u>920</u> | <u>1093</u> | <u>Yes</u> | <u>BM</u> | <u>53</u> | <u>53</u> | <u>Yes</u> |
| E30 | 890 | 920 | 1048 | Yes | BM | 53 | 45 | Yes |
| E31 | 864 | 920 | 1000 | Yes | BM | 53 | 35 | Yes |
| E32 | 854 | 920 | 981 | Yes | BM | 53 | 30 | Yes |
| <u>E33</u> | <u>1232</u> | <u>920</u> | <u>1191</u> | <u>No</u> | <u>Weld</u> | <u>0</u> | <u>64</u> | <u>No</u> |
| <u>E34</u> | <u>1153</u> | <u>920</u> | <u>1118</u> | <u>No</u> | <u>Weld</u> | <u>0</u> | <u>56</u> | <u>No</u> |
| <u>E35</u> | <u>1017</u> | <u>920</u> | <u>992</u> | <u>No</u> | <u>Weld</u> | <u>0</u> | <u>33</u> | <u>No</u> |
| <u>E36</u> | <u>1000</u> | <u>920</u> | <u>977</u> | <u>No</u> | <u>Weld</u> | <u>1</u> | <u>28</u> | <u>No</u> |

In the above Tables 5 and 6, the examples which are not according to the invention are underlined.

These results show that, when the welded blank 15 is heated to a heat treatment temperature comprised within the above-described temperature range, with a holding time comprised between 2 and 10 minutes at the heat treatment temperature, before press-forming and cooling, the failure occurs in the weakest base metal ("substrate of the second precoated steel sheet" in the above Tables 5 and 6) of the assembly, and not in the weld joint 22 (experiments E1, E2, E5, E10, E12, E13, E16, E18, E22 and E29 to E32).

On the contrary, for a heat treatment temperature that is strictly smaller than the minimum heat treatment temperature $T_{min}$+15° C. and for a holding time comprised between 2 and 10 minutes at the heat treatment temperature, failure is observed to either always occur in the weld joint 22 (experiments E3, E4, E6 to E8, E14, E15, E17, E19, E21, E23, E27 to E27 and E33 to E36) or to occur in the weld joint 22 in at least some of the tensile specimens for a considered experiment (experiments E9, E11, E20, E24 and E28, referenced "mix" in the table).

The inventors have further noted that, in all the experiments that are according to the invention, the weld joint 22 has a microstructure comprising a fraction of intercritical ferrite $\alpha_{IC}$ comprised between 15% and $\alpha_{IC}^{max}$−5%.

These results evidence that, when the welded blank 15 is heat treated using the heat treatment conditions according to the present disclosure, the weld joint 22 has an ultimate tensile strength that is strictly greater than that of the weakest base material, corresponding to the substrate 4 of the second precoated steel sheet 2. Therefore, it is this substrate 4 that forms the weakest zone of the part, and not the weld joint 22. Failure will thus occur in the substrate 4 of the second precoated steel sheet 2 and not in the weld joint 22 itself. These results are surprising, since they are obtained even though the weld joint 22 has not been entirely austenitized and therefore does not have a mainly martensitic and/or bainitic microstructure after heat treatment.

The method according to the present disclosure is therefore particularly advantageous, since it allow determining the optimal process parameters (including the minimum heat treatment temperature and amount of filler material to be added) in order to obtain a part having satisfactory properties while minimizing the production cost and time.

What is claimed is:

1. A method for producing a press-hardened laser welded steel part comprising the following successive steps:
   providing a first precoated steel sheet and a second precoated steel sheet, each of the first and second precoated steel sheets comprising a steel substrate, at least one of the first and second precoated steel sheets having, on at least one of its main faces, an aluminum-containing precoating comprising at least 50% by weight of aluminum,
   the first precoated steel sheet having a first thickness and the second precoated steel sheet having a second thickness,
   the steel substrate of the first precoated steel sheet having, after press-hardening, an ultimate tensile strength greater than the ultimate tensile strength, after press-hardening, of the steel substrate of the second precoated steel sheet, and
   the product of the first thickness by the ultimate tensile strength, after press-hardening, of the first precoated steel sheet being greater than the product of the second thickness by the ultimate tensile strength, after press-hardening, of the second precoated steel sheet; then
   butt welding the first precoated steel sheet and the second precoated steel sheet using laser welding so as to obtain a weld joint between the first and second precoated steel sheets thereby obtaining a welded blank, the butt welding step optionally including using a filler material;
   heating the welded blank to a heat treatment temperature, the heat treatment temperature being at least 10° C. lower than the full austenitization temperature of the weld joint and at least 15° C. higher than a minimum temperature $T_{min}$, where $$T_{min}(° C.) = AC3(WJ) - \frac{\alpha_{IC}^{max}}{100}(Ac3(WJ) - 673 - 40 \times Al),$$

where
Ac3(WJ) is the full austenitization temperature of the weld joint, in ° C. and Al is the content of aluminum in the weld joint, in wt. %,
and $\alpha_{IC}^{max}$ is the maximum intercritical ferrite content of the weld joint, calculated using the following formula:

$$\alpha_{IC}^{max} = \left(1 - \frac{(1+\rho)(\max(1;\rho)Ts_2 - 350)}{(1-\beta)(\rho Ts_2 + Ts_1) + \beta(1+\rho)(3130C^{FW} + 750) - 350(1+\rho)}\right) \times 100,$$

where
$T_{S1}$ is the ultimate tensile strength of a stronger one of the two steel substrates after press-hardening, in MPa,
$T_{S2}$ is the ultimate tensile strength of a weaker one of the two steel substrates after press-hardening, in MPa,
$C^{FW}$ is the carbon content of the filler material, in wt. %,
β is the proportion of the filler material added to a weld pool, comprised between 0 and 1,
ρ is the ratio between the thickness of the precoated steel sheet comprising the weaker steel substrate and the thickness of the precoated steel sheet comprising the stronger steel substrate ($\rho = t_2/t_1$);
holding the welded blank at the heat treatment temperature for a time comprised between 2 and 10 minutes;
press-forming the welded blank into a steel part; and
cooling the thus formed steel part with a cooling speed greater than or equal to the critical martensitic or bainitic cooling speed of the most hardenable steel substrate among the steel substrates of the first and second precoated steel sheets so as to obtain a press-hardened welded steel part.

2. The method as recited in claim 1, wherein, after press-hardening, the ratio between the ultimate tensile strength of the steel substrate of the first precoated steel sheet and the ultimate tensile strength of the steel substrate of the second precoated steel sheet is greater than or equal to 1.2.

3. The method as recited in claim 1, wherein the carbon content of the steel substrate of the first precoated steel sheet is higher by at least 0.05 wt. % than the carbon content of the steel substrate of the second precoated steel sheet.

4. The method as recited in claim 1, wherein each of the first and second precoated steel sheets comprises an aluminum-containing precoating comprising at least 50% by weight of aluminum on at least one of its main faces.

5. The method as recited in claim 1, wherein the first and second precoated steel sheets comprise an aluminum-containing precoating comprising at least 50% by weight of aluminum on both of their main faces.

6. The method as recited in claim 1, wherein, at the time of the butt welding, the aluminum-containing precoating remains integral on both main faces of at least one among the first precoated steel sheet and the second precoated steel sheet.

7. The method as recited in claim 1, further comprising, prior to the butt welding, a step of preparing the weld edge of at least one among the first and the second precoated steel sheet by removing the aluminum-containing precoating over at least a fraction of its thickness on at least one main face thereof.

8. The method as recited in claim 1, wherein, for at least one of the first and the second precoated steel sheets, the steel of the steel substrate comprises, by weight:
0.10% ≤ C ≤ 0.5%
0.5% ≤ Mn ≤ 3%
0.1% ≤ Si ≤ 1%
0.01% ≤ Cr ≤ 1%
Ti ≤ 0.2%
Al ≤ 0.1%
S ≤ 0.05%
P ≤ 0.1%
B ≤ 0.010%
a remainder being iron and impurities resulting from manufacturing.

9. The method as recited in claim 8, wherein, for at least one of the first and the second precoated steel sheets, the steel of the steel substrate comprises, by weight:
0.15% ≤ C ≤ 0.25%
0.8% ≤ Mn ≤ 1.8%
0.1% ≤ Si ≤ 0.35%
0.01% ≤ Cr ≤ 0.5%
Ti ≤ 0.1%
Al ≤ 0.1%
S ≤ 0.05%
P < 0.1%
B ≤ 0.005%
the remainder being iron and impurities resulting from manufacturing.

10. The method as recited in claim 1, wherein, for at least one of the first and the second precoated steel sheets, the steel of the steel substrate comprises, by weight:
0.040% ≤ C ≤ 0.100%
0.70% ≤ Mn ≤ 2.00%
Si ≤ 0.50%
S ≤ 0.009%
P ≤ 0.030%
0.010% ≤ Al ≤ 0.070%
0.015% ≤ Nb ≤ 0.100%
Ti ≤ 0.080%
N ≤ 0.009%
Cu ≤ 0.100%
Ni ≤ 0.100%
Cr ≤ 0.2%
Mo ≤ 0.100%
Ca ≤ 0.006%,
a remainder being iron and impurities resulting from manufacturing.

11. The method as recited in claim 1, wherein, for at least one of the first and the second precoated steel sheets, the steel of the steel substrate comprises, by weight:
0.06% ≤ C ≤ 0.100%
1.4% ≤ Mn ≤ 1.9%
0.2% ≤ Si ≤ 0.5%
0.010% ≤ Al ≤ 0.070%
0.04% ≤ Nb ≤ 0.06%
3.4×N ≤ Ti ≤ 8×N
0.02% ≤ Cr ≤ 0.1%
0.0005% ≤ B ≤ 0.004%
0.001% ≤ S ≤ 0.009%
a remainder being iron and impurities resulting from manufacturing.

12. The method as recited in claim 1, wherein, for at least one of the first and the second precoated steel sheets, the steel of the steel substrate comprises, by weight:
0.24% ≤ C ≤ 0.38%
0.40% ≤ Mn ≤ 3%
0.10% ≤ Si ≤ 0.70%
0.015% ≤ Al ≤ 0.070%
0% ≤ Cr ≤ 2%
0.25% ≤ Ni ≤ 2%

0.015% ≤ Ti ≤ 0.10%
0% ≤ Nb ≤ 0.060%
0.0005% ≤ B ≤ 0.0040%
0.003% ≤ N ≤ 0.010%
0.0001% ≤ S ≤ 0.005%
0.0001% ≤ P < 0.025%
wherein the titanium and nitrogen contents satisfy the following relationship:

Ti/N > 3.42, and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05% ≤ Mo ≤ 0.65%
0.001% ≤ W ≤ 0.30%
0.0005% ≤ Ca ≤ 0.005%
a remainder being iron and impurities inevitably resulting from manufacturing.

13. The method as recited in claim 1, wherein the laser welding is performed using a protection gas.

14. The method as recited in claim 13, wherein the protection gas is helium and/or argon.

15. The method as recited in claim 1, wherein the first and the second precoated steel sheets have different thicknesses.

16. The method as recited in claim 1, wherein the welding is carried out without using any filler material.

17. The method as recited in claim 1, wherein the welding is carried out using the filler material.

18. The method as recited in claim 1, wherein the filler material has the following composition, by weight:
0.1% ≤ C ≤ 1.2%
0.01% ≤ Mn ≤ 10%
0.02% ≤ Ni ≤ 7%
0.02% ≤ Cr ≤ 5%
0.01% ≤ Si ≤ 2%
optionally:
traces ≤ Mo ≤ 1%
traces ≤ Ti ≤ 0.1%
traces ≤ V ≤ 0.1%
traces ≤ B ≤ 0.01%
traces ≤ Nb ≤ 0.1%
traces ≤ Al ≤ 0.05%
a remainder being iron and impurities inevitably resulting from manufacturing.

19. The method recited in claim 1, wherein the average aluminum content in the weld joint is comprised between 0.5 wt. % and 1.25 wt. %.

* * * * *